United States Patent
Ripper et al.

(10) Patent No.: US 7,546,728 B2
(45) Date of Patent: Jun. 16, 2009

(54) METHOD FOR OPERATING A CATALYTIC CONVERTER USED FOR PURIFYING THE EXHAUST GAS OF AN INTERNAL COMBUSTION ENGINE AND A DEVICE FOR IMPLEMENTING THE METHOD

(75) Inventors: Wolfgang Ripper, Stuttgart (DE); Stefan Wickert, Albershausen (DE); Johannes Schaller, Vaihingen An Der Enz (DE); Hartmut Lueders, Oberstenfeld (DE); Christian Walz, Durmersheim (DE); Thorsten Mayer, Worms (DE); Ralf Schernewski, Karlsruhe (DE); Matthias Loehr, Steinheim/Hoepfigheim (DE); Ulf-Peter Schmeling, Benningen A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/171,105

(22) Filed: Jun. 29, 2005

(65) Prior Publication Data
US 2006/0000202 A1    Jan. 5, 2006

(30) Foreign Application Priority Data
Jun. 30, 2004    (DE) .................. 10 2004 031 624

(51) Int. Cl.
*F01N 3/00*    (2006.01)
(52) U.S. Cl. .............. 60/286; 60/274; 60/295; 60/297; 60/301
(58) Field of Classification Search .......... 60/274, 60/286, 295, 297, 301, 303; 422/148, 149, 422/188
See application file for complete search history.

(56) References Cited

U.S. PATENT DOCUMENTS

| | | | | |
|---|---|---|---|---|
| 5,628,186 A | * | 5/1997 | Schmelz | 60/274 |
| 6,546,720 B2 | * | 4/2003 | van Nieuwstadt | 60/286 |
| 6,619,035 B2 | * | 9/2003 | Matsuoka et al. | 60/286 |
| 6,698,191 B2 | * | 3/2004 | Xu et al. | 60/286 |
| 6,761,025 B1 | * | 7/2004 | Gladden | 60/286 |
| 6,892,530 B2 | * | 5/2005 | Montreuil et al. | 60/295 |
| 6,928,359 B2 | * | 8/2005 | Xu et al. | 701/102 |
| 6,941,746 B2 | * | 9/2005 | Tarabulski et al. | 60/286 |
| 6,969,492 B1 | * | 11/2005 | Goerigk et al. | 422/177 |
| 6,990,800 B2 | * | 1/2006 | van Nieuwstadt et al. | 60/277 |
| 6,993,900 B2 | * | 2/2006 | Upadhyay et al. | 60/286 |
| 7,028,465 B2 | * | 4/2006 | Ripper et al. | 60/286 |
| 7,086,222 B2 | * | 8/2006 | Itoh et al. | 60/286 |
| 7,093,427 B2 | * | 8/2006 | van Nieuwstadt et al. | 60/286 |

FOREIGN PATENT DOCUMENTS

| | | |
|---|---|---|
| DE | 197 39 848 | 3/1999 |
| DE | 101 39 142 | 2/2003 |
| EP | 697 062 | 2/1996 |
| EP | 1 024 254 | 8/2000 |

* cited by examiner

*Primary Examiner*—Tu M Nguyen
(74) *Attorney, Agent, or Firm*—Kenyon & Kenyon LLP

(57) ABSTRACT

A method for operating a catalytic converter used for purifying the exhaust gas of an internal combustion engine, and a device for implementing the method, which provide for an open-loop or closed-loop control of the reagent fill level in the catalytic converter to a predefined storage setpoint value. The targeted stipulation of the storage setpoint value ensures, on one hand, that in non-stationary states of the internal combustion engine, there is a sufficient quantity of reagent available for the completest possible removal of at least one unwanted exhaust-gas component, and on the other hand, a reagent slip is avoided.

8 Claims, 2 Drawing Sheets

US 7,546,728 B2

METHOD FOR OPERATING A CATALYTIC CONVERTER USED FOR PURIFYING THE EXHAUST GAS OF AN INTERNAL COMBUSTION ENGINE AND A DEVICE FOR IMPLEMENTING THE METHOD

BACKGROUND INFORMATION

German Patent Application No. DE 101 39 142 describes an exhaust-gas treatment system of an internal combustion engine, in which, to reduce the NOx emissions, an SCR (selective catalytic reduction) catalytic converter is used which reduces the nitrogen oxides contained in the exhaust gas to nitrogen using the reagent ammonia. The ammonia is obtained in a hydrolysis catalytic converter, situated upstream from the SCR catalytic converter, from a urea-water solution. The hydrolysis catalytic converter converts the urea contained in the urea-water solution to ammonia and carbon dioxide.

In German Patent Application No. DE 197 39 848, a procedure is described by which the untreated NOx emissions of the internal combustion engine can be at least approximately calculated from known operating parameters of the internal combustion engine. The starting point is a family of characteristics which is defined (spanned) by the load and the speed of the internal combustion engine. In addition, corrections can be provided, for example, as a function of the air ratio lambda.

European Patent Application No. EP 1 024 254 describes an exhaust-gas treatment system of an internal combustion engine, in which an SCR catalytic converter is likewise used for reducing NOx emissions. Ammonia is again provided as a reagent, which is obtained in the exhaust duct from a urea-water solution. The reagent rate is set on the basis of the fuel injection quantity and the speed of the internal combustion engine, as well as on the basis of at least one characteristic of the exhaust gas, e.g. the exhaust-gas temperature.

In European Patent Application No. EP 697 062, a method and a device are described for the controlled introduction of a reagent into an exhaust gas containing nitrogen oxide. An SCR catalytic converter is likewise provided which, as a reagent, needs ammonia that is obtained from a reagent introduced into the exhaust duct upstream of the SCR catalytic converter. At least one operationally-relevant parameter of the exhaust gas, at least one operationally-relevant parameter of a catalytic converter and optionally one operationally-relevant parameter of an internal combustion engine are acquired for determining the untreated NOx emissions of the internal combustion engine. In accordance with the ascertained untreated NOx emissions, an intermediate value is determined for a reagent rate to be stipulated, which is reduced by a reagent rate desorbed by the catalytic converter or is increased by a reagent rate adsorbed by the catalytic converter.

An object of the present invention is to provide a method for operating a catalytic converter used for purifying the exhaust gas of an internal combustion engine and a device for implementing the method which avoid overdosage and underdosage of the reagent.

SUMMARY OF THE INVENTION

The procedure of the present invention provides for open-loop or closed-loop control (regulation) of the reagent stored in a catalytic converter to a predefined storage setpoint value. The targeted stipulation of the storage setpoint value has the advantage that in non-stationary states of the internal combustion engine, on one hand there is a sufficient quantity of reagent available for the completest possible removal of at least one unwanted exhaust-gas component, and on the other hand, a reagent slip is avoided. Synonymous with the closed-loop or at least open-loop control to the predefined storage setpoint value is the closed-loop or at least open-loop control of the degree of saturation of the catalytic converter with the reagent. The degree of saturation corresponds to the ratio of the instantaneous adsorbed reagent quantity to the maximum possible reagent fill level of the catalytic converter.

One refinement provides that the storage setpoint value is a function of a measure for the temperature of the catalytic converter. This refinement takes into account the temperature dependence of the catalytic-converter storage capacity. One further development provides that, below an operating-temperature range of the catalytic converter toward lower temperatures, the temperature-dependent storage setpoint value is reduced. This further development takes into account the fact that the catalytic activity in the catalytic converter decreases as lower temperatures are approached. Another further development provides that, after a maximum lying within the operating-temperature range of the catalytic converter toward higher temperatures, the temperature-dependent storage setpoint value is reduced. This further development ensures that the maximum for the reagent fill level lies within the operating-temperature range of the catalytic converter, and that the decreasing reagent storage capacity of the catalytic converter, as higher temperatures are approached, is taken into account.

One development provides that a storage actual value reflecting the reagent fill level of the catalytic converter is ascertained at least on the basis of the NOx mass flow passing into the catalytic converter. In another embodiment, a storage actual value reflecting the reagent fill level is ascertained at least on the basis of an NOx mass flow leaving the catalytic converter. Consideration of the NOx mass flow passing into and/or leaving the catalytic converter permits comparatively simple ascertainment of the reagent fill level of the catalytic converter, since the NOx mass flows may be calculated on the basis of known operating parameters of the internal combustion engine and/or of the exhaust gas and/or of the catalytic converter.

One further refinement provides for calculation of a storage actual value reflecting the reagent fill level. The calculation is carried out on the basis of the reagent mass flow passing into the catalytic converter, reduced by the difference between the NOx mass flow passing into the catalytic converter and the NOx mass flow leaving the catalytic converter, further reduced by the reagent slip.

The device of the present invention relates to a data carrier on which the method of the present invention is stored as software. The device of the present invention also relates to a control unit of an internal combustion engine in which the method of the present invention is stored. The software may be brought directly or via a long-distance data transmission (Internet) onto the data carrier.

DETAILED DESCRIPTION

Figure 1:
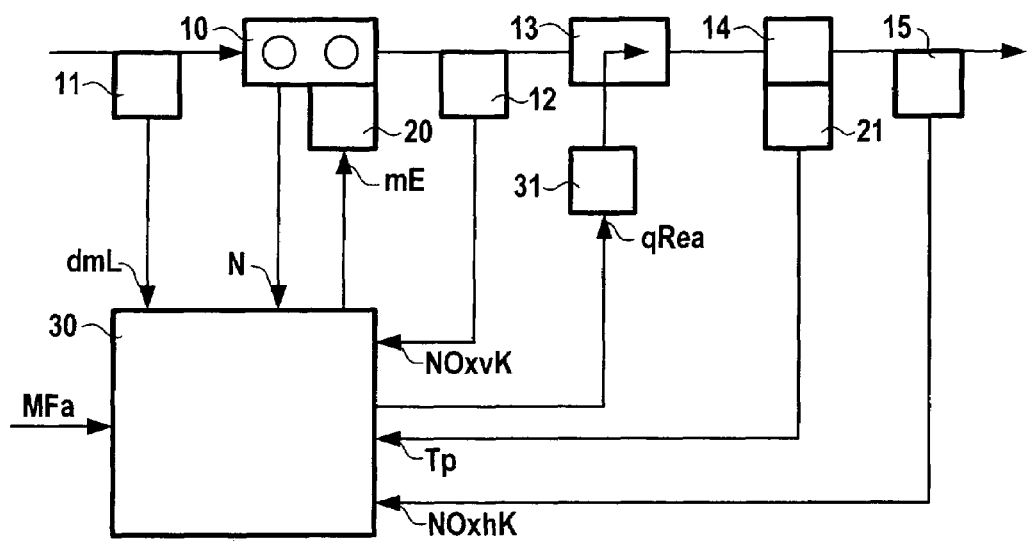
FIG. 1 shows a technical environment in which a method of the present invention proceeds.

FIG. 1 shows an internal combustion engine 10, in whose intake region an air sensor 11 is arranged, and in whose exhaust region a first NOx sensor 12, a reagent-introducing device 13, a catalytic converter 14 and a second NOx sensor 15 are arranged. A fuel-metering device 20 is assigned to internal combustion engine 10, and a temperature sensor 21 is assigned to catalytic converter 14.

The air sensor provides an air signal dmL to a control unit 30. Internal combustion engine 10 emits a speed N to control unit 30. First NOx sensor 12 provides a first NOx signal NOxvK and second NOx sensor 15 provides a second NOx signal NOxhK to control unit 30. Temperature sensor 21 supplies a temperature signal Tp. Moreover, a torque setpoint value MFa, derived from an accelerator pedal (not shown) of a motor vehicle (likewise not further shown) is sent to control unit 30.

Control unit 30 emits a fuel signal mE to fuel-metering device 20. Control unit 30 triggers a reagent dosing valve 31 using a dosing signal qRea.

Figure 2:
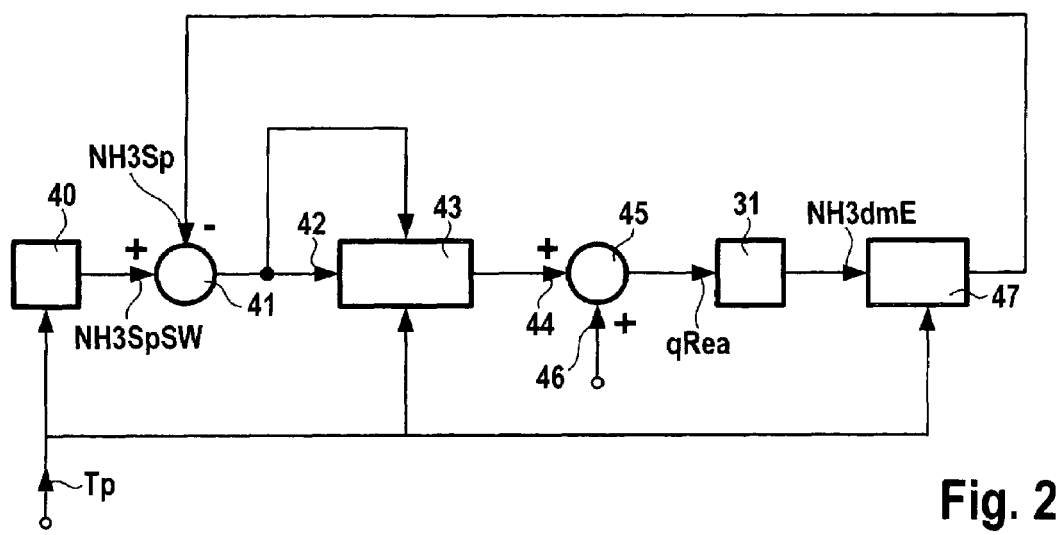
FIG. 2 shows a structure of a control loop.

FIG. 2 shows a setpoint input unit 40 which emits a storage setpoint value NH3SpSW to a first summing unit 41 that forms the difference between storage setpoint value NH3SpSW and a storage actual value NH3Sp. System deviation 42 made available by first summing unit 41 is processed in a controller 43 to form a manipulated variable 44 that is fed to a second summing unit 45. Second summing unit 45 adds manipulated variable 44 to a pre-control variable 46 and supplies dosing signal qRea which acts upon reagent-dosing valve 31.

Dosing valve 31 releases a reagent flow NH3dmE, passing into catalytic converter 14, which is an input variable of a catalytic-converter model 47 that provides storage actual value NH3Sp.

Temperature signal Tp is made available to setpoint-input unit 40, controller 43 and catalytic-converter model 47.

Figure 3:
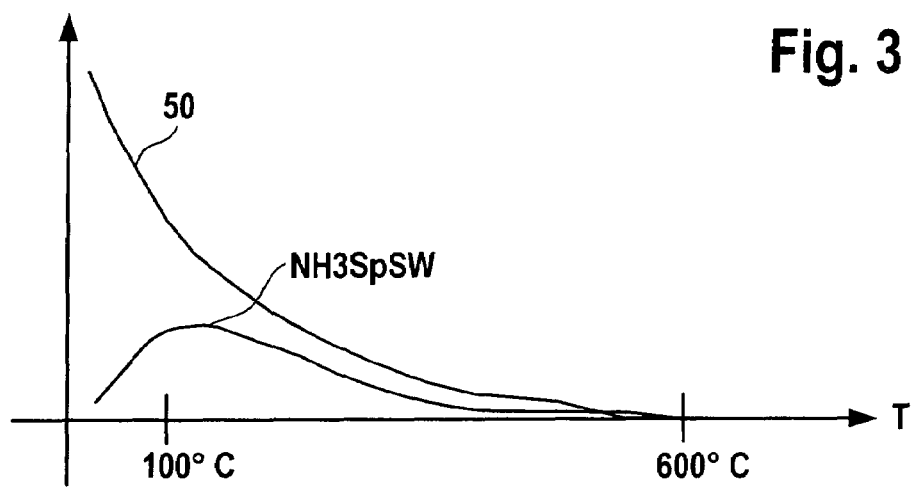
FIG. 3 shows a reagent fill level as a function of the temperature.

FIG. 3 shows a maximum possible reagent fill level 50, as well as storage setpoint value NH3SpSW as a function of the temperature.

Figure 4:
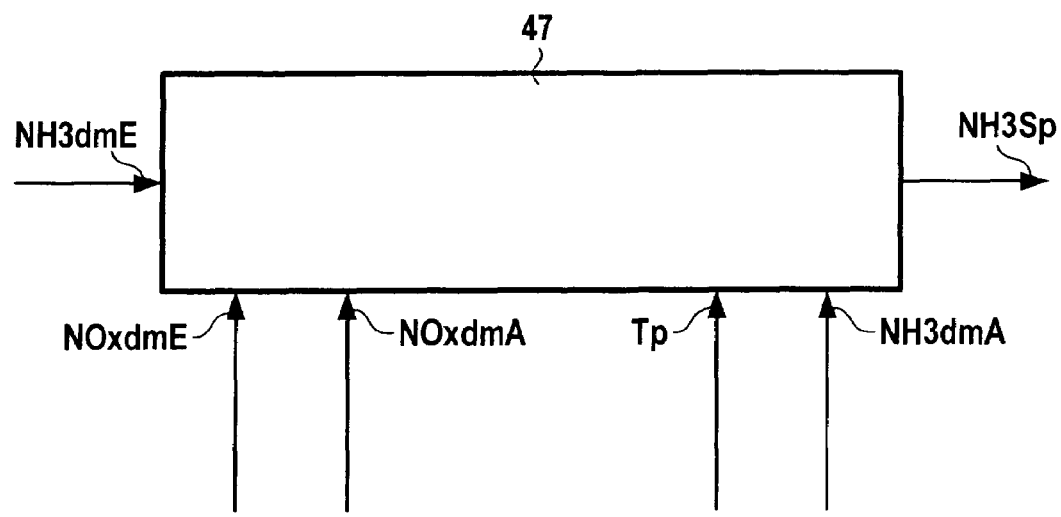
FIG. 4 shows a model of a catalytic converter.

FIG. 4 shows catalytic-converter model 47 which is supplied with reagent flow NH3dmE streaming in, an NOx mass flow NOxdmE, which is related to the reagent, that flows into catalytic converter 14, an NOx mass flow NOxdmA, which is related to the reagent, that leaves catalytic converter 14, and a reagent slip NH3msAus. Catalytic-converter model 47 provides storage actual value NH3Sp. In addition, temperature signal Tp and/or the estimated efficiency of catalytic converter 14 may be fed to catalytic-converter model 47.

The method according to the present invention functions as follows:

As a function at least of torque setpoint value MFa and/or as a function of speed N and/or as a function of air signal dmL, control unit 30 shown in FIG. 1 stipulates fuel signal mE which determines the fuel quantity metered to internal combustion engine 10 by fuel-metering device 20. The at least one catalytic converter 14 disposed in the exhaust region of internal combustion engine 10 is provided to eliminate at least one exhaust-gas component of internal combustion engine 10. In the exemplary embodiment shown, the catalytic converter is in the form of an SCR catalytic converter which is intended to eliminate as completely as possible the untreated NOx emissions emitted by internal combustion engine 10. According to type models presently available, SCR catalytic converter 14 needs a reagent which can be introduced as such or in the form of a precursor into the exhaust-gas flow upstream of catalytic converter 14. To that end, reagent-introducing device 13 is provided which may optionally be identical with dosing valve 31. As precursor for the reagent, a urea-water solution is provided, for example, which is converted into ammonia upstream of catalytic converter 14 or in catalytic converter 14 by thermolysis and hydrolysis. Alternatively, ammonia may be provided directly as reagent. The ammonia may also be obtained from ammonium carbamate.

The ammonia reagent reacts in SCR catalytic converter 14 with nitrogen oxides to form nitrogen and water. Dosing signal qRea may be stipulated, for example, at least as a function of the load status of internal combustion engine 10 and/or as a function of engine speed N. A measure for the load status of internal combustion engine 10 is, for instance, torque setpoint value MFa or fuel signal mE. If the dosing of the reagent is too low, the untreated NOx emissions of the internal combustion engine would be only partially eliminated. An overdosing is to be avoided, since a reagent breakthrough occurs downstream of catalytic converter 14.

Catalytic converter 14 has a storage capacity with respect to the reagent. According to the present invention, it is provided to control in closed loop, or at least to control in open loop, the reagent fill level of catalytic converter 14 to the predefined storage setpoint value NH3SpSW. In the exemplary embodiment, a closed-loop control is assumed whose structure is shown in FIG. 2. Synonymous with the closed-loop or at least open-loop control to predefined storage setpoint value NH3SpSW is the closed-loop or at least open-loop control of the degree of saturation of catalytic converter 14 with the reagent. The degree of saturation corresponds to the ratio of the instantaneous adsorbed reagent quantity—the storage actual value NH3Sp—to the maximum possible reagent fill level 50 of catalytic converter 14.

Storage setpoint value NH3SpSW, stipulated by setpoint input unit 40, is compared in first summing unit 41 to storage actual value NH3Sp made available by catalytic-converter model 47. First summing unit 41 forms the difference which is fed as system deviation 42 to controller 43, which from it, ascertains manipulated variable 44. System deviation 42 is also supplied to controller 43 for influencing the controller characteristics. If controller 43 is a PI controller, system deviation 42 is able to influence the P (proportional) component and/or the I (integral-action) component. For example, a complete cutoff of the P component may be provided if system deviation 42 exceeds a predefined threshold value. Provision may also be made that, in the event of a negative system deviation, manipulated variable 44 always has a predefined amount that corresponds to a minimum dosing signal qRea. This measure takes into account that reagent-dosing valve 31 cannot dose arbitrarily small reagent amounts.

In second summing unit 45, manipulated variable 44 is added to optionally available pre-control variable 46. Optionally formed pre-control variable 46 may predefine, for example, a basic quantity of the reagent to be dosed as a function of operating parameters of internal combustion engine 10. Manipulated variable 44, which is optionally linked with available pre-control variable 46, stipulates dosing signal qRea which is sent to reagent-dosing valve 31. Dosing signal qRea releases an opening cross-section of reagent-dosing valve 31 that corresponds to a predefined reagent flow rate, which is furthermore a function of the reagent pressure.

The reagent arrives, via reagent-introducing device 13, at the exhaust region of internal combustion engine 10 upstream of catalytic converter 14. Compressed air may be admixed if desired. Depending on the implementation, reagent-dosing valve 31 and reagent—introducing device 13 may coincide. Reagent flow NH3dmE passing into catalytic converter 14 is taken into account as an input variable of catalytic-converter model 47.

Setpoint input unit 40 stipulates storage setpoint value NH3SpSW preferably as a function of at least one measure for the temperature of catalytic converter 14. This refinement takes into account, on one hand, the temperature-dependent storage capacity of catalytic converter 14 with respect to the reagent, and on the other hand, the temperature-dependent catalytic activity.

FIG. 3 shows the maximum possible reagent fill level 50 in catalytic converter 14. Maximum possible reagent fill level 50 decreases as the temperature rises. Setpoint input unit 40 stipulates storage setpoint value NH3SpSW in such a way that, in the event of a sudden sharp temperature increase, the desorbed NH3 quantity is able to bring a reaction to completion in catalytic converter 14 with the NOx quantities available, without generating a reagent slip NH3dmA. For example, the predefined difference between maximum possible reagent fill level 50 and storage setpoint value NH3SpSW should not drop below 20%.

A specification of the degree of saturation, which corresponds to the relationship of currently adsorbed reagent quantity to maximum possible reagent fill level 50, corresponds to the specification of storage setpoint value NH3SpSW.

The consideration of the measure for the temperature of catalytic converter 14 also plays an important role. Temperature sensor 21 provides the measure for the temperature temp (Tp) of catalytic converter 14. In the exemplary embodiment shown, temperature sensor 21 is allocated directly to catalytic converter 14. In one practical implementation, temperature sensor 21 may be disposed upstream of catalytic converter 14, in particular downstream of catalytic converter 14, as well as at a suitable location within catalytic converter 14. In another embodiment, at least two temperature sensors may be provided at different locations. Another possibility provides for the calculation of at least one measure for temperature temp (Tp) of catalytic converter 14 on the basis of operating parameters of internal combustion engine 10 and/or characteristics of the exhaust gas and/or of catalytic converter 14 itself.

Setpoint input unit 40 takes into account the decrease in catalytic activity in catalytic converter 14 by a reduction of storage setpoint value NH3SpSW toward lower temperatures. A maximum of storage setpoint value NH3SpSW is obtained which essentially lies at the lower border of the operating-temperature range of catalytic converter 14.

The measure for temperature Tp of catalytic converter 14 is furthermore fed to controller 43 for influencing the P component and/or I component. This refinement takes into account that controller 43 may be at least partially or completely switched off if there is a drop below a predefined lower temperature limit.

Storage actual value NH3Sp is ascertained by catalytic-converter model 47 at least in light of reagent flow NH3dmE passing into catalytic converter 14. Moreover, NOx mass flow NOxdmE streaming into catalytic converter 14, corresponding to the untreated NOx emissions of internal combustion engine 10, is preferably taken into account. To simplify the calculations, NOx mass flow NOxdmE passing into catalytic converter 14 can be related to the reagent NH3. Furthermore, NOx mass flow NOxdmA leaving catalytic converter 14 is preferably taken into account and is likewise expediently related to the reagent NH3. Catalytic-converter model 47 forms the difference between NOx mass flow NOxdmE flowing into and NOx mass flow NOxdmA leaving catalytic converter 14.

Catalytic converter model 47 optionally may also take into account the reagent slip NH3dmA, which, however, may be omitted to simplify the calculation of the reagent fill level corresponding to storage actual value NH3Sp. Moreover, if desired, temperature signal Tp and/or the calculated efficiency of catalytic converter 14 may be considered.

A change in storage actual value NH3Sp, corresponding to a change in the reagent fill level, may be calculated as follows:

$$dNH3Sp = NH3dmE - (NOxdmE(NH3\text{-specific}) - NOxdmA(NH3\text{-specific})) - NH3dmA.$$

The reagent fill level corresponding to storage actual value NH3Sp is yielded by ascertaining the time integral.

The preferably NH3-specific NOx mass flow NOxdmA leaving catalytic converter 14 may alternatively be ascertained in light of the catalytic-converter efficiency. In this case, it is possible to take into account the measure for temperature Tp of catalytic converter 14 and/or storage actual value NH3Sp and/or the exhaust-gas velocity and/or the feed ratio alpha, which is given by the reagent flow NH3dmE flowing in relative to the NOx mass flow NOxdmE flowing in.

The preferably NH3-specific NOx mass flow NOxdmE passing into catalytic converter 14 and/or the preferably likewise NH3-specific NOx mass flow NOxdmA leaving catalytic converter 14 may be calculated on the basis of operating parameters of internal combustion engine 10 and/or characteristics of the exhaust gas. In the exemplary embodiment shown, to detect NOx mass flow NOxdmE passing into catalytic converter 14, first NOx sensor 12 is provided which makes available first NOx signal NOxvK. First NOx sensor 12 detects the NOx concentration in the exhaust gas, which must be set off against the exhaust-gas mass flow to obtain the NOx mass flow. In the exemplary embodiment shown, to detect the preferably NH3-specific NOx mass flow NOxdmA leaving catalytic converter 14, second NOx sensor 15 is provided which makes available the second NOx signal NOxhK. Second NOx sensor 15 detects the NOx concentration in the exhaust gas, which again must be set off against the exhaust-gas mass flow to obtain the NOx mass flow.

An alternative form of the ascertainment of storage actual value NH3Sp provides for the use of a Lunberg observer which ascertains storage actual value NH3Sp from state variables of catalytic-converter model 47. In this case, catalytic converter 14 to be observed is modeled and the model receives the same input variables as the real system. Deviations between the real and the modeled output variables are fed back as correction via a feedback structure into the modeled system. The input variables for catalytic-converter model 47 may, for example, be reagent flow NH3dmE passing into catalytic converter 14, NOx mass flow NOxdmE passing into catalytic converter 14 as well as the air ratio Lambda in the exhaust gas. Temperature Tp of catalytic converter 14, NOx mass flow NOxdmA leaving catalytic converter 14 as well as reagent slip NH3dmA are provided, for example, as output variables.

What is claimed is:

1. A method for operating a catalytic converter used for purifying exhaust gas of an internal combustion engine, the method comprising:

introducing into an exhaust duct, upstream of the catalytic converter, a reagent needed in the catalytic converter;

controlling a reagent fill level of the catalytic converter to a predefined storage setpoint value, wherein the predefined storage setpoint value is adjusted by a control element as a function of a measure for a temperature of the catalytic converter;

below an operating-temperature range of the catalytic converter toward lower temperatures, continuously reducing the temperature-dependent storage setpoint value by the control element; and after a maximum lying within an operating-temperature range of the catalytic converter toward higher temperatures, reducing the temperature-dependent storage setpoint value by the control element.

2. The method according to claim 1, further comprising ascertaining a storage actual value reflecting the reagent fill level at least on the basis of a reagent flow streaming in.

3. The method according to claim 1, further comprising calculating a storage actual value reflecting the reagent fill level from a time integral of a reagent flow passing into the catalytic converter, reduced by a difference between an NOx mass flow, which is related to the reagent, that flows into the catalytic converter and that leaves the catalytic converter, reduced further by a reagent slip.

4. The method according to claim 1, further comprising ascertaining a storage actual value reflecting the reagent fill level of the catalytic converter at least on the basis of an NOx mass flow, which is related to the reagent, that flows into the catalytic converter.

5. The method according to claim 4, further comprising ascertaining the NOx mass flow, which is related to the reagent, that flows into the catalytic converter, at least on the basis of operating parameters of the internal combustion engine which include at least one of a load status of the internal combustion engine, an engine speed and an air signal provided by an air sensor disposed in an intake region of the internal combustion engine.

6. The method according to claim 1, further comprising ascertaining a storage actual value reflecting the reagent fill level at least on the basis of an NOx mass flow, which is related to the reagent, that leaves the catalytic converter.

7. The method according to claim 6, further comprising ascertaining the NOx mass flow, which is related to the reagent, that leaves the catalytic converter, on the basis of a catalytic-converter efficiency, and wherein, to ascertain the catalytic-converter efficiency, at least one of (a) at least one measure for a temperature of the catalytic converter, (b) a storage actual value reflecting the reagent fill level of the catalytic converter, (c) an exhaust-gas velocity and (d) a feed ratio, which indicates a ratio between a reagent flow that streams in and the NOx mass flow, which is related to the reagent, that streams in, is taken into account.

8. A device for operating a catalytic converter used for purifying exhaust gas of an internal combustion engine, the device comprising:
  means for introducing into an exhaust duct, upstream of the catalytic converter, a reagent needed in the catalytic converter;
  means for controlling a reagent fill level of the catalytic converter to a predefined storage setpoint value, wherein the predefined storage setpoint value is adjusted by a setpoint control element as a function of a measure for a temperature of the catalytic converter;
  wherein the setpoint control element continuously reduces, below an operating-temperature range of the catalytic converter toward lower temperatures, the temperature-dependent storage setpoint value; and
  wherein the setpoint control element reduces, after a maximum lying within an operating-temperature range of the catalytic converter toward higher temperatures, the temperature-dependent storage setpoint value.

* * * * *